(12) United States Patent
Hioki et al.

(10) Patent No.: US 6,681,015 B1
(45) Date of Patent: Jan. 20, 2004

(54) DIGITAL RECORDING/REPRODUCING SYSTEM

(75) Inventors: Toshiaki Hioki, Ogaki (JP); Hisashi Matsuyama, Ogaki (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/301,202

(22) Filed: Apr. 28, 1999

(30) Foreign Application Priority Data

Apr. 30, 1998 (JP) .......................................... 10-120379

(51) Int. Cl.⁷ .......................... H04N 7/167; G06F 17/60
(52) U.S. Cl. ...................... 380/231; 380/202; 380/228; 705/52; 705/53; 705/58; 705/59
(58) Field of Search ............................... 380/201, 202, 380/228, 230, 231, 279, 280; 705/52, 53, 54, 57, 58, 59, 71, 77, 78; 713/193

(56) References Cited

U.S. PATENT DOCUMENTS 5,651,066 A * 7/1997 Moriyasu et al. ........... 380/282
5,918,215 A * 6/1999 Yoshioka et al. ............. 705/30

FOREIGN PATENT DOCUMENTS

| EP | 0 802 535 | 10/1997 | ........... G11B/19/00 |
| EP | 809244 A2 * | 11/1997 | ........... G11B/20/00 |
| EP | 0 814 474 | 12/1997 | ........... G11B/20/10 |
| JP | 7-231440 | 8/1995 | ........... H04N/7/16 |
| JP | 9-214929 | 8/1997 | ........... H04N/7/16 |

OTHER PUBLICATIONS

Patent Abstracts of Japan, vol. 97, No. 12, Dec. 25, 1997 & JP 09 214929 A, Aug. 15, 1997.
Patent Abstracts of Japan, vol. 95, No. 11, Dec. 26, 1995 & JP 07 231440 A, Aug. 29, 1995.

* cited by examiner

Primary Examiner—Justin T. Darrow
(74) Attorney, Agent, or Firm—Armstrong, Kratz, Quintos, Hanson & Brooks, LLP

(57) ABSTRACT

A digital recording/reproducing system includes a set top box. The STB receives a digital television broadcast signal and transmits a scrambled data stream from a stream selector via an interface to a digital recording/reproducing apparatus. In the data recording/reproducing apparatus, a scramble key is acquired depending on a billing request for data recording. To AS-MO disc are recorded a contents key converted from a disc unique ID using a descramble key as well as the data stream. In accordance with a user's approval for the billing, an account table is created which is registered in an IC card and transmitted via a MODEM and telephone line.

10 Claims, 13 Drawing Sheets

- PAY REQUIRED TO REPRODUCE THIS TITLE
- IT IS ¥ XXXX PER TITLE
- REPRODUCE ?

YES   NO (B)

- PAY REQUIRED TO REPRODUCE THIS TITLE
- IT IS ¥ XXXX PER T MINUTE
- REPRODUCE ?

YES   NO

DIGITAL RECORDING/REPRODUCING SYSTEM

BACKGROUND OF THE INVENTION

1. Field of the Invention

This invention relates to digital recording/reproducing systems. More particularly, the invention relates to a system which records or reproduces digital television broadcast utilizing, for example, CS (Communication Satellite), BS (Broadcasting Satellite) or ground waves onto or from a digital recording medium, such as a DVD-RAM, MO disc or hard disc.

2. Description of the Related Art

Recently, in analog television broadcast utilizing ground waves, television signals can be recorded to and reproduced from a VTR or the like. Meanwhile, there are cases that a pay television signal, such as of CATV, is applied with copy protection. For example, the position of a horizontal synchronizing signal is changed so as not to be brought into synchronization by using a usual television receiver or VTR. In this case, video recording is impossible to perform. Furthermore, the rental videos, for example, are generally processed with Macrovision Company's copy guard. They accordingly can be reproduced by a VTR. However, if a VTR-reproduced video image is tried to be recorded again, the video image will go out of order and is impossible to look and listen to.

Meanwhile, perfecTV, DirecTV, JskyB and so on (all service marks) have inaugurated their digital broadcast services utilizing communication satellites (CS). In these of digital television broadcast, the Macrovision's copy guards are applied to unrecordable programs. As for the recordable program, if a fee higher than the usual subscription rate is paid, such program can be recorded as an analog television signal. In such a case, it is possible to carry out dubbing with the recorded video tape. Such dubbing, if performed for purposes other than personal enjoyment, would result in violation against the Copyright law. Such dubbing may financially damage the broadcaster.

Also, copy guard systems have being introduced to an application of the DVD (Digital Video Disc) recorded with a movie or the like. In DVD, the video signal is compressed according to MPEG, similarly to digital television broadcast. The DVD reproducer decompresses the compressed video signal and converts it into an analog television signal, being supplied through a connection terminal to the television receiver. The analog television signal output through the connection terminal is processed with Macrovision's copy guard.

In both the broadcast media and the storage media, measures are taken such that the digital television signal cannot be copied for the purpose of protecting copyright.

Incidentally, in Japanese Patent Laid-open No. 214929/1997 (Billing System Apparatus) [H04N 7/16, 5/91], billing is implemented in accordance with a program during reproducing/dubbing with a VTR-recorded pay-program television signal, wherein an STB (Set Top Box) received signal is multiplexed with a pay-program code and further processed with copy protection in order to prevent against unpaid dubbing, thus being supplied to the VTR. The VTR releases the copy protection to perform scrambled recording. Also, in reproduction, a reproduced signal is descrambled and processed for copy protection by the VTR, thus being supplied in a pay-program encoded form to the STB. There is a proposal that a billing-implementation signal is outputted from the STB to the VTR wherein descrambling is effected only in a (viewing) duration of outputting such a billing-implementation signal. This method enables billing to occur not only during recording but also in reproducing.

Furthermore, in Japanese Patent Laid-open No. 231440/1995 (View Billing System) [HO4N/ 7/16, 7/167], a billing system for a chargeable broadcast attempts to receive a scramble broadcast and descrambles it by means of an exclusive decoder in order to view and listen. This prior art carries out billing on a particular time period basis excepting the titles descrambled in overlap, for a purpose of performing billing (possible by a recording/producing means such as VTR and special reproduction) for each of viewed programs. The identification information for the program billed is sent to a center. This information is stored on the viewer's side, and updated (erased or added in a specified time) as required. Or otherwise, the billed-program information is stored and updated in the center without store by the viewer. According to the second prior art reference, the scrambled data, the release signal and the program identification information are digitally recorded and, upon reproduction, corrected into the before-record information form. Meanwhile, where no program identification information is inputted together with scramble data, descrambling is not carried out.

In the case of the first prior art reference, the copy-source media and the copy-destination media are the same. That is, this art is effective for a case of billing per viewing time, i.e., PPV (Pay Per View). However, in the case of title billing to effect billing during recording to enable viewing and listening after that time in a free fashion, it can be considered that the information to be recorded has not been scrambled. In such a case, it is possible to carry out illegal copying.

That is, in the both of the prior art references, billing systems have been proposed to digitally record and reproduce digital broadcast to or from a digital VTR, etc., to carry out billing. With these prior art references, it is possible to copy into a same tape form or the like. Also, billing is possible on a viewing time basis.

However, these prior art references could not be used in a service of title selling over, i.e., wherein a fee is paid upon recording a broadcast television signal and thereafter the recorded signal is utilizable exclusive for reproduction, such as in DVD or VIDEO-CD. Also, in these prior art references, copying could not be implemented because the DVD or the like was impossible to copy.

SUMMARY OF THE INVENTION

Therefore, it is a primary object of this invention to provide a novel digital recording/reproducing system.

It is another object of this invention to provide a novel billing system in digital video recording.

It is another object of this invention to provide a billing system which is capable of digitally recording a digital video image legally onto a rewritable-type recording device.

It is another object of this invention to provide a billing system which is capable of effectively effects billing when duplicating a digital video image.

A digital recording system according to the present invention has a digital data output apparatus to output scrambled digital data and a digital recording apparatus, to record the digital data to a digital recording medium, wherein the digital recording medium includes previously recorded unique identification data, the digital recording system comprising: a reading means for reading the unique identification data out of the data recording medium; a key data creating means for creating key data based on the unique identification data and a descramble key; a recording means for recording the scrambled digital data and the key data to the digital recording medium; a first approval getting means for getting an approval from a user on a billing for digital recording; an account table creating means for creating an account table depending upon an approval of the billing by the user; and a register means for registering the account table.

That is, when the user approves the billing for digital recording, a descramble key is provided. Based on this descramble key and unique identification data, key data is created. The scrambled digital data and this key data are recorded in the digital recording medium. According to the user's approval on the billing, an account table is created which is registered, for example, in an IC card and transmitted to a center.

A digital recording system according to the present invention has a digital data output apparatus to output scrambled digital data and a digital recording apparatus, to record the digital data in a digital recording medium, wherein the digital recording medium includes previously recorded unique identification data, the digital recording system comprising: a reading means for reading the unique identification data out of the data recording medium; a first key creating means for creating a first key based on the unique identification data; a second key creating means for creating a second key based on the first key and a descramble key; a recording means for recording the scrambled digital data and the second key to the digital recording medium; a first approval getting means for getting from a user an approval of a billing for digital recording; an account table creating means for creating an account table depending upon a billing approval by the user; and a register means for registering the billing table.

That is, when the user approves the billing for digital recording, a descramble key is provided. Based on this descramble key and unique identification data, key data is created. The scrambled digital data and the second key are recorded in the digital recording medium. According to the user's approval on the billing, an account table is created which is registered, for example, in an IC card and transmitted to a center.

A digital reproducing system according to the present invention is for reproducing scrambled digital data out of a digital recording medium, wherein the digital recording medium includes previously recorded unique identification data and key data, the digital reproducing system comprising: a reading means for reading the unique identification data out of the data recording medium; a first key creating means for creating a first key based on the unique identification data; a restoring means for restoring unique identification data based on the key data and the first key; a determining means for determining whether or not there is coincidence between unique identification data read by the reading means and unique identification data restored by the restoring means; and an allowing means for allowing reproduction of the digital data when a coincidence is determined by the determining means.

Furthermore, a method for reproducing digital data out of a digital recording medium wherein scrambled digital data and key data are recorded on the digital recording medium having unique identification data previously recorded, the digital data reproducing method comprising: (a) reading the unique identification data out of the data recording medium; (b) creating a first key based on the unique identification data; (c) restoring unique identification data based on the key data and the first key; (d) determining whether or not the read unique identification data and the restored identification data are coincident with; and (e) allowing reproduction of the In the digitally reproducing method or system, reproduction is made from a digital recording medium previously recorded with unique identification data. This digital recording medium is recorded with scrambled digital data and key data. If there is coincidence between unique identification data read out of the digital recording medium and unique identification data restored, or between contents keys in the embodiment, the scrambled digital data is allowed to be reproduced. In this case, a descramble key can be restored from the contents key. If the two unique identification data (contents keys) are not coincident, reproduction is prohibited unless the user approve the billing.

According to this invention, billing is effectively implemented when recording or reproducing from the digital data reproduced from a digital television broadcast or digital recording medium, making possible legal copying of digital data.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 16 is an illustrative view showing one example displaying a billing condition, etc. on the screen where reproducing title in the FIG. 15 embodiment.

DETAILED DESCRIPTION OF THE PREFERRED EMBODIMENTS

Figure 1:
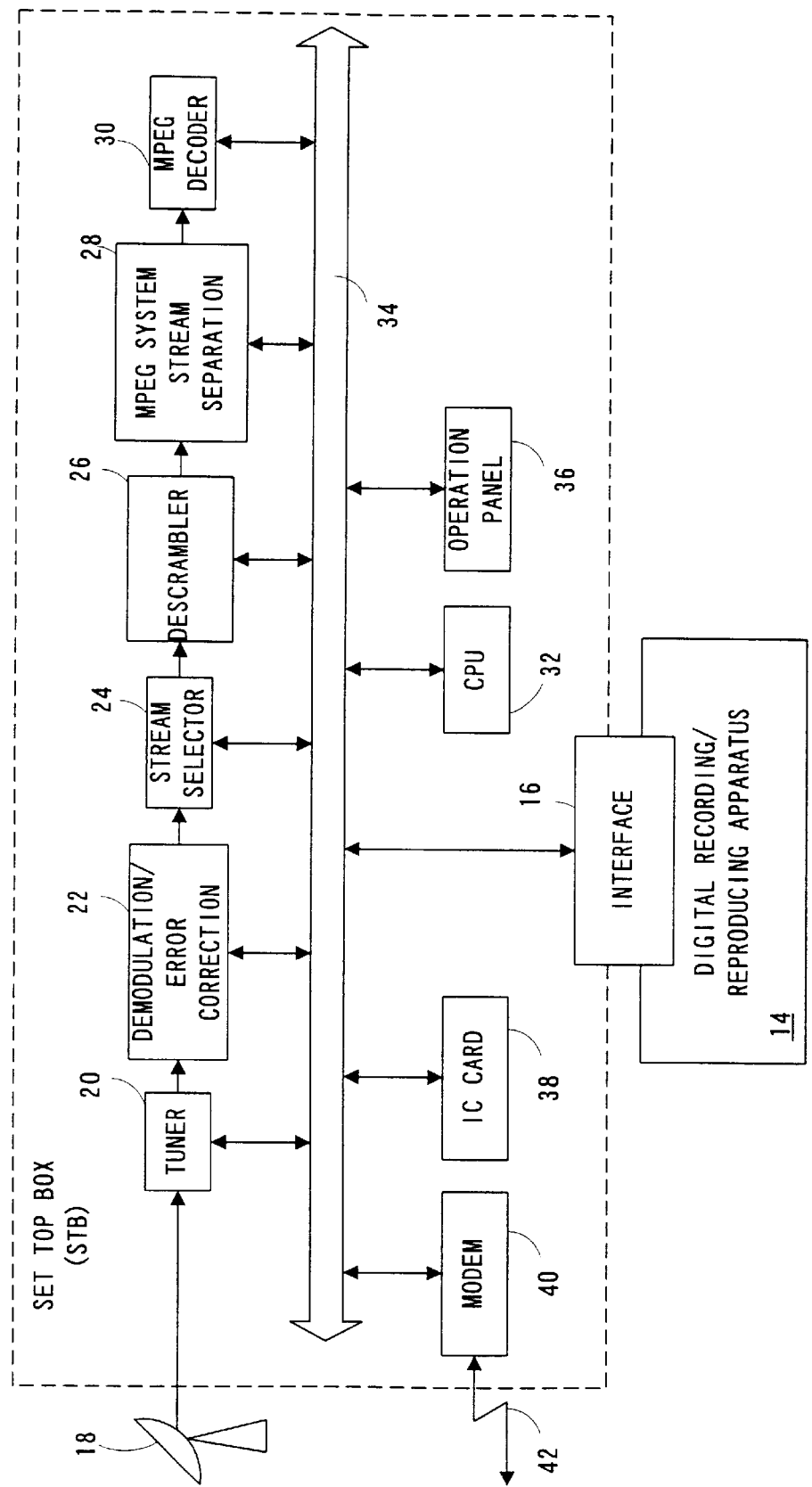
FIG. 1 is a block diagram showing a digital television broadcast recording/reproducing system as one embodiment of this invention.
Figure 2:
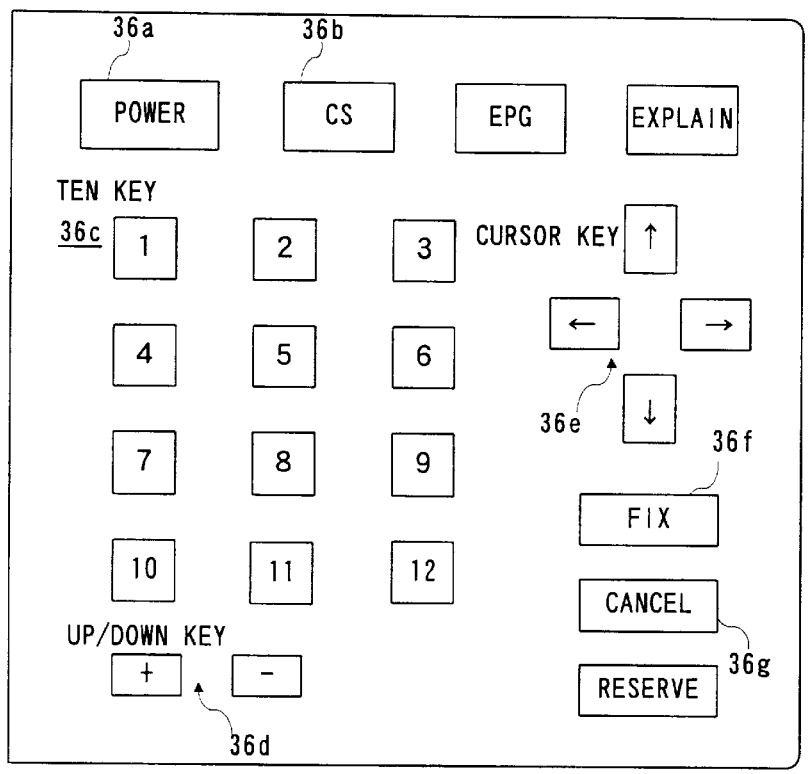
FIG. 2 is an illustrative view showing one example of an operation panel used in the FIG. 1 embodiment.

A digital television broadcast recording/reproducing system 10 of this embodiment includes, as shown in FIG. 1, a set top box (hereinafter referred to as "STB") 12 and a digital recording/reproducing apparatus 14, to communicate with record data and control signals between the STB 12 and the digital recording/reproducing apparatus 14 through an interface 16. Incidentally, it should be noted beforehand that the digital television signals to which the invention is to be applied include those of broadcast not only from satellites, such as CS and BS, but also those through ground waves.

When viewing a normal digital broadcast program, a radio wave of digital television signal is captured by an antenna 18. The digital television signal is waveform-detected by a digital tuner 20. In demodulation/error correction 22, the detected digital television signal is demodulated and subjected to required error correction, being outputted in a digital bit stream form. This digital bit stream is multiplexed, in packets with a certain given length, with video data, audio data, program information and so on. A bit stream rate of approximately 29.16 Mbps is employed in this embodiment. The video data of one channel has a bit rate of approximately 6 Mbps, and audio data has a bit rate of approximately 300 kbps. Other program information has approximately a bit rate of 2.56 Mbps.

The bit stream packet is of a transport packet scheme, including 4 bytes of a header, 184 bytes of data and 16 bytes of error correction codes. The packet header includes information representative of what the data attribute is, i.e., what the audio, video or control signal data is, and a flag (scramble flag) representative of whether or not the data is scrambled.

A stream selector 24 separates a header, video data and audio data from the data stream. The separated video and audio data output by the descramble 26 is sent through an MPEG system stream separation 28 to an MPEG decoder 30 where the video data and the audio data is reproduced into video and audio signals.

The operation panel 36 is a remote control unit connected by wire or wirelessly to the STB 12. The operation panel 36 includes a power switch 36a and a CS switch 36b. The CS switch 36b is used in setting to receive a digital television broadcast using CS. The operation panel 36 includes further a ten key 36c and up/down key 36b. These keys are used principally for channel selection. The operation panel 36 includes a cursor key 36e, a determine key 36f and a cancel key 36h to purchase a pay-per-view (PPV) broadcast.

The above program information is also inputted as billing information from the CPU 32 to an IC card 38. In a PPV broadcast, the user approves, on a menu screen, a pay for a program through using the operation panel 36. If a pay is approved, an approval signal is sent from the CPU 32 to a MODEM 40, which is further sent from the MODEM 40 through a telephone line 42 to a center (not shown). The center, in turn, sends a descramble key back to the MODEM 40 via a telephone line 42. Thus, the scramble key is inputted to the IC card 38 so that the IC card 38 can receive the descramble key. Consequently, the descramble key required for the descrambler 26 to descramble the data is sent from the IC card 38 to the descrambler 26 through the bus 34.

Incidentally, the MODEM 40 and the telephone line 42 are communication means used to communicate with billing information to and from the center (not shown). Here, the "center" means an entity used to manage on billing for digital television broadcasts. The center issues a bill to a user in accordance with billing information sent from the STB 12, which asks for payment. Meanwhile, although the IC card 38 is dismountably mounted on the STB 12, a memory built within the STB 12 may be used in place of the IC card 38.

When digitally recording the video and audio data in the received digital television signal, the data required is sent from the stream selector 24 via the bus 34 and interface 16 to the digital recording/reproducing apparatus 14. Thus, in the digital recording/reproducing apparatus 14, recording is made for the video and audio data that have not been descrambled by the descrambler 26.

To reproduce the television data recorded, the reproduced data that is inputted via the interface 16 to the STB 12 is inputted from the stream selector 24 to the descrambler 26. In this case, because the scramble has to be removed by the descrambler 26, the CPU 32 delivers the descramble key to the descrambler 26 after a billing condition, etc., is set similarly to the PPV program case explained before, and the user approved the billing.

Figure 3:
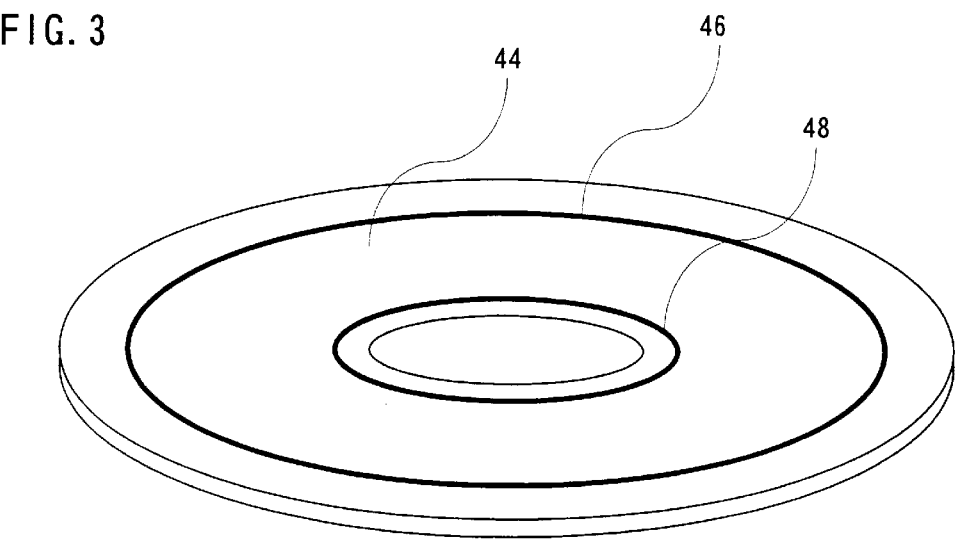
FIG. 3 is an illustrative view showing one example of AS-MO used in the FIG. 1 embodiment

The digital recording/reproducing apparatus 14 may utilize an arbitrary digital recording medium, such as a magnet-optical disc, DVD-RAM, hard disc and so on. However, a magnet-optical disc (hereinafter referred to al "AS-MO disc") as an example is used for explaining hereinbelow. THE AS-MO 44 has media identified (hereinafter abbreviated merely as "ID") assigned to part of data read/write areas in innermost and outermost bands according to the AS-MO rating, as shown in FIG. 3. Here, the "band" means a doughnut-formed data read/write area as obtained by radially dividing the disc into a plurality of numbers. Although this data read/write area is used to optimize the sic capacity, it has no direction effect on the present invention.

Referring to FIG. 3, IDs are recorded at respective sites in an outer peripheral portion 46 and an inner peripheral portion 48 on the AS-MO disc 44. These IDs are recorded by physical MO film destruction into a fashion as if they were in a form alike CD (Compact Disc) pits. Consequently, these IDs cannot be altered. On the other hand, AS-MO disc 44 is formed, on its disc surface, with a spiral groove for representing a physical on-disc position, whereby address information is provided on the groove inner wall. This address information is also not alterable. It should be noted that although in this embodiment the IDs are provided by destroying the MO film over the AS-MO disc 44, these IDs can be given to a particular area by using the groove in a manner similar to the address information.

Incidentally, the ID is configured by a number or symbol unique to a media (medium), which is natively assigned to each disc in order to enable discriminate, one by one, a disc during manufacture process. Although no concrete method for ID assignment is described in the above-stated AS-MO rating, this embodiment employs 32 bits of a natural-binary number. It can be considered to practically give an ID "manufacturer's no. + manufactured year/month/day+ serial no. on a day" in consideration of security and manufacture site, etc.

Figure 4:
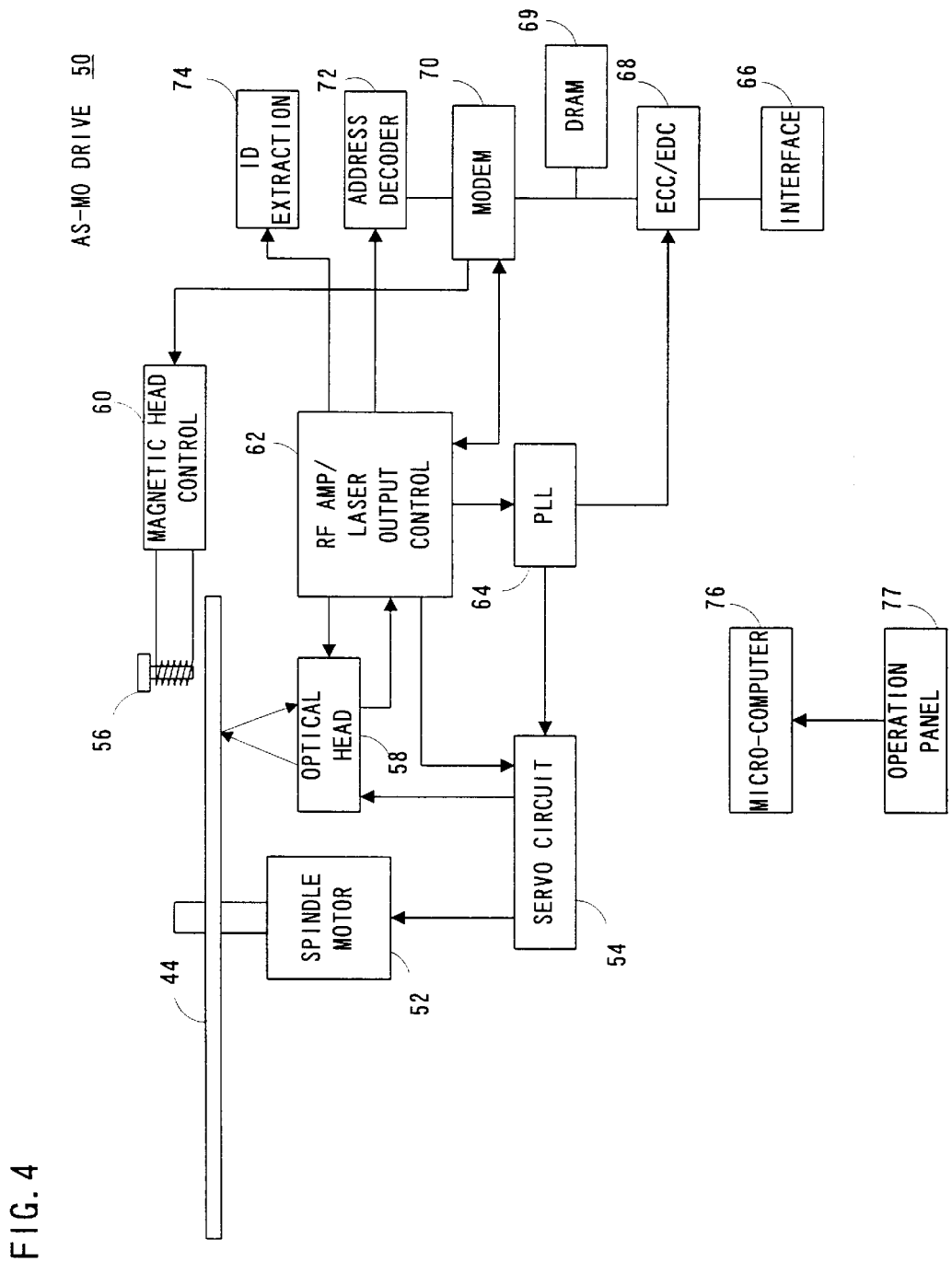
FIG. 4 is a block diagram showing one example of an AS-MO drive in the FIG. 1 embodiment.

The AS-MO disc 44 shown in FIG. 3 is used on an AS-MO drive 50 shown in FIG. 4. The AS-MO drive 50 is one example of the digital recording/reproducing apparatus 14 shown in FIG. 1. The AS-MO disc 44 is rotated through a spindle motor 52 wherein rotational control is effected by a servo circuit 54. Data record is magnet-optically recorded with a laser caused by a magnetic head 56 and optical head 58. The magnetic head 56 is controlled by a magnetic head control 60, while the optical head 58 is controlled by an RF amplifier/laser power control 62.

The data recorded on the AS-MO disc 44 is reproduced by the optical head 58 and the RF amplifier/laser output control 62. The RF amplifier/laser output control 62 has an RF signal which is supplied to a PLL (Phase Locked Loop) 64 through a low-pass filter (not shown). The PLL 64 generates a clock based on the RF signal. The data to be recorded is supplied via from the interface 16 (FIG. 1) to an interface 66. The record data is given an error correction code by an ECC (Error Correction Circuit)/EDC (Error Detection Circuit) 68. The record data is further modulated by a MODEM 70 and supplied to the magnetic head control 60. The data reproduced from the AS-MO disc 44 is demodulated by the MODEM 70 and error-corrected by the ECC/EDC 68, being supplied via the interface 66 to a host (STB12 in this embodiment).

Incidentally, a DRAM 69 is used as a working memory for the ECC/EDC 68.

In recording/reproducing the data, address information as explained before is used to specify a position on the AS-MO disc 44. The address information, previously recorded on this disc 44, is given through the optical head 58 and RF amplifier/laser power control 62 to an address decoder 72. Note that address management will be described later. Meanwhile, the disc ID used in the embodiment is extracted, by an ID extraction 74, from an RF signal supplied to the RF amplifier/laser output control 62. The address data and ID is sent to the micro-computer 76 so that the magnetic head 56 and the optical head 58 are controlled in position on the disc 44. Note that in FIG. 4 are omitted connection lines between the micro-computer 76 and the controlled circuit portions for the sake of avoiding troublesomeness. That is, in this AS-MO drive 50 the micro-computer 76 performs control on various portions and acts for firmware including interface protocol, security software and so on.

The micro-computer 76 is connected to an operation panel 77 with or without a wire so that control signal or control data is inputted from the operation panel 77 to the micro-computer 76.

Figure 5:
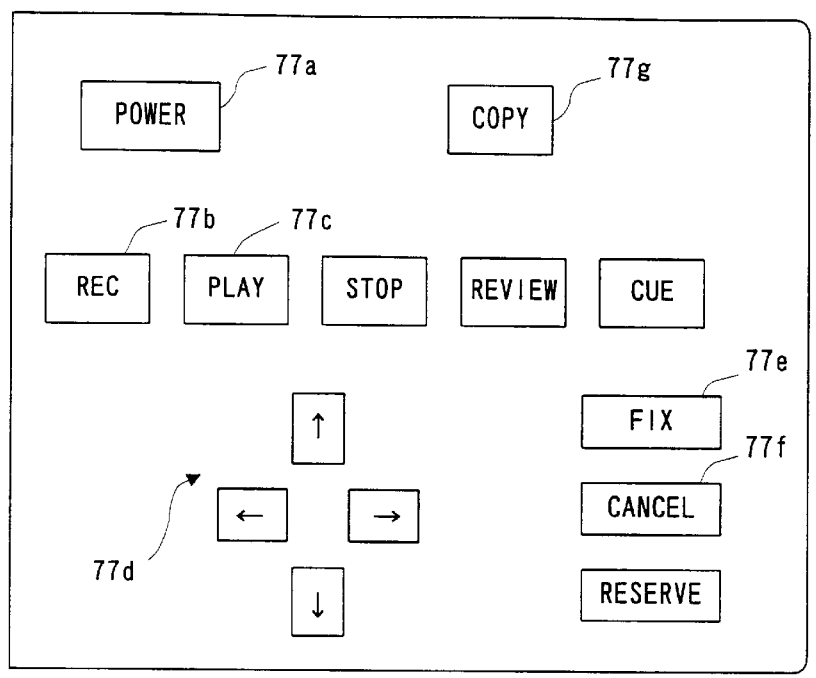
FIG. 5 is an illustrative view showing one example of an operation panel used in the FIG. 4 embodiment.

As shown in FIG. 5, the operation panel 77 includes a power switch 77a, and further a record switch 77b and a reproduction switch 77c to instruct recording reproduction from the AS-MO disc 44. A cursor key 77d, a determine key 77e and a cancel key 77f are used for approving on or rejecting a billing condition for recording and reproducing. If the user desires disc copy, a copy key 77g on the operation panel 77 may be operated.

Figure 6:
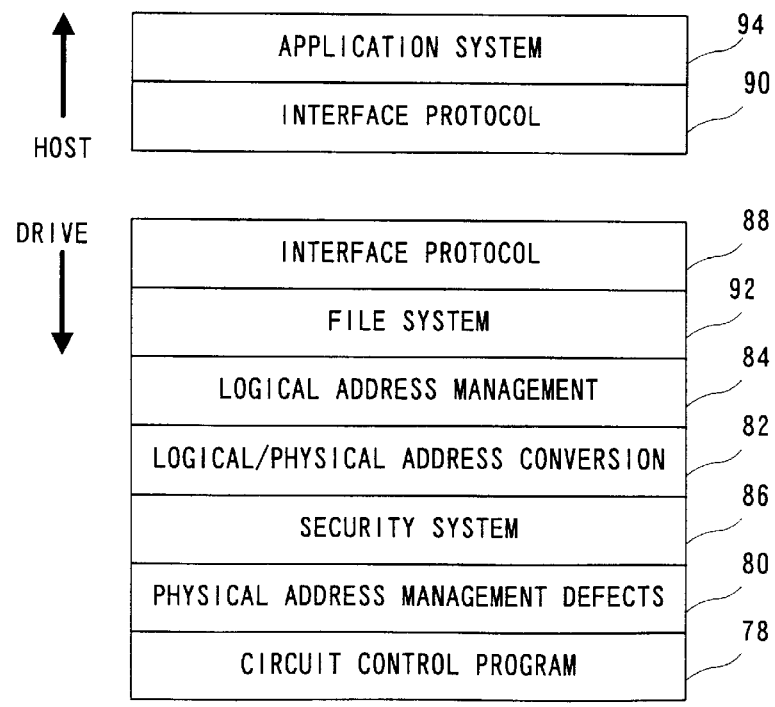
FIG. 6 is an illustrative view showing one example of a hierarchical program to control the operations of the CPU in the FIG. 1 embodiment and the micro-computer in the FIG. 4 embodiment.

FIG. 6 shows a hierarchical structure of software to be executed by the micro-computer 76 of the AS-MO drive 50 as well as the CPU 32 of the host (STB 12) in this embodiment. The AS-MO drive 50 has, on a circuit control program 78, a physical address management/defect control program 80 to manage the addresses given to the groove of the disc 44. The defect control program 80 is in close relation to a logical-physical address conversion program 82. If the disc has no defects, the conversion in address from logical to physical is simple. However, if a certain physical address data area is destroyed due to defects, the data-destroyed area is replaced by another area by the defect control program 80. The logical address management program 84 manages on data logical addresses.

A security system program 86 is software used to realize an encryption system using the ID of this embodiment, which uses encrypt/decrypt data from the ID extracted by the ID extract 74 (FIG. 4). Encryption and decryption commands are communicated between the drive and the host (STB 12) according to interface protocol programs 88 and 90. The encryption scheme is structurally invisible to the host. Such encryption/decryption is described later.

A file system 92 of the drive 50 in this embodiment is provided with a UDF (Universal Disc Format). This file system 92 enables communication file by file to and from the host. The host (STB 12) has an application system program 94 that is software to record/produce with digital broadcast reception signals in the FIG. 1 embodiment, as described later.

Incidentally, the interface protocols 88 and 90 may be an interface, such as SCSI and ATAPI, that is generally used for personal computers or CD-ROMs. However, this embodiment employs an exclusive interface. Note that the interface per se is not especially important.

Figure 7:
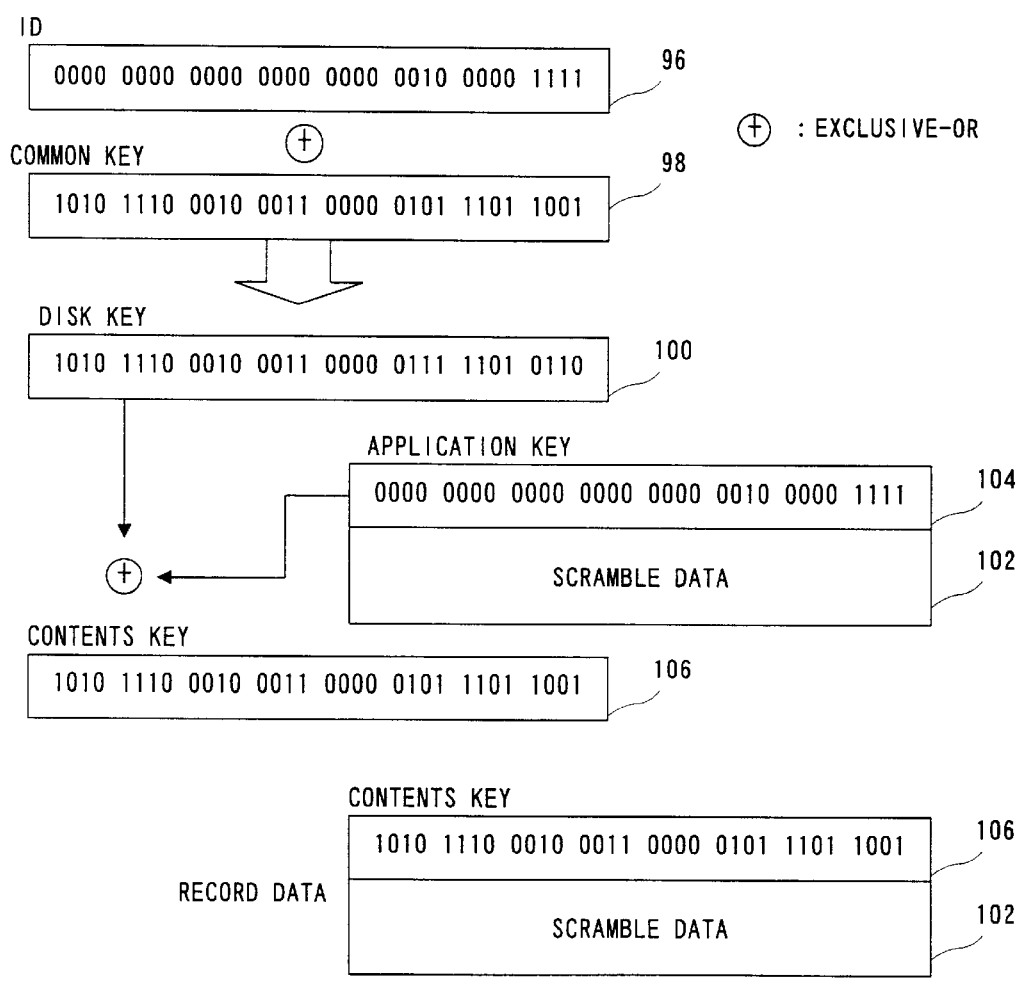
FIG. 7 is an illustrative view showing the keys used in the FIG. 4 embodiment and their recording way.

FIG. 7 shows an encryption/decryption technique as an embodiment to be executed by the security program 86 (FIG. 6). The ID 96 recorded unalterable and uniquely to the AS-MO disc 44 adopted a 32-bit natural binary number, as stated before. Using the ID 96 and the 32-bit common key 98, a key unique to each AS-MO disc, or disc key, 100 is created. The method for creating a disc key 100 includes a complicated technique. This embodiment, however, creates a disc key 100 by subjecting the ID 96 and the common key 98 to exclusive-ORing.

The created 32-bit disc key 100 is sent from the micro-computer 76 (FIG. 4) to the MODEM 70 and stored in a security information recording site of the AS-MO disc 44, similarly to the record data. This disc key 100, although may be stored through encryption in consideration of security, in this embodiment is recorded as it is. The security information recording area is a site impossible to recognize as a file system 92 (FIG. 6), which is recorded close to the site recorded with the ID in the inner peripheral portion 46 and/or the outer peripheral portion 48 of the AS-MO disc 44 shown in FIG. 3.

The application information to be recorded in the AS-MO disc 44, in the FIG. 1 embodiment, is a digital broadcast program bit stream. The application information 102 has already been scrambled, as described before. There exists a descramble key or application key 104 (FIG. 7) to be offered to the descrambler 26 (FIG. 1) for removing such scramble. The descramble key or application key 104 uses a 32-bit fixed key, although it controls the descrambler 26 and billing-information managing IC card 38.

As shown in FIG. 7, a contents key 106 is created through an appropriate arithmetic operation, etc., based on this application key 104 and the above-mentioned disc key 100. There are various techniques for creating a contents key 106, as in the disc key 100. In this embodiment, however, that key was created by exclusive-ORing the disc key 100 and the application key 104.

When reproducing video/audio data from the AS-MO disc 44, the micro-computer 76 first reads an ID 96 from the ID extraction 74, and creates disc key 100 from the,ID 96 and common key 98 according to the security program 86 (FIG. 60. the micro-computer 76 then performs an inverse arithmetic operation (exclusive-ORing in this embodiment) for a disc key 100 form the contents key 106 reproduced from the disc 44, thereby creating an application key 104. This application key 104 is sent from the micro-computer 76 via the interfaces 66 and 16 to the CPU 32 of the STB 12. In the STB 12, the descramble 26 can remove the scramble from the reproducing scramble data 102 by means of the application key 104 delivered from the CPU 32.

If recorded file (including the contents key 106 and the scrambled data 102) is copied to another AS-Mo disc, the disc key 100 to be created by the above process is different from a disc key of the original disc. It is natural that the application key created from a contents key with a different disc key cannot successfully release the scrambled data. As a result of this, it is possible to protect a copyright against copying digital record of a digital television broadcast.

Figure 8:
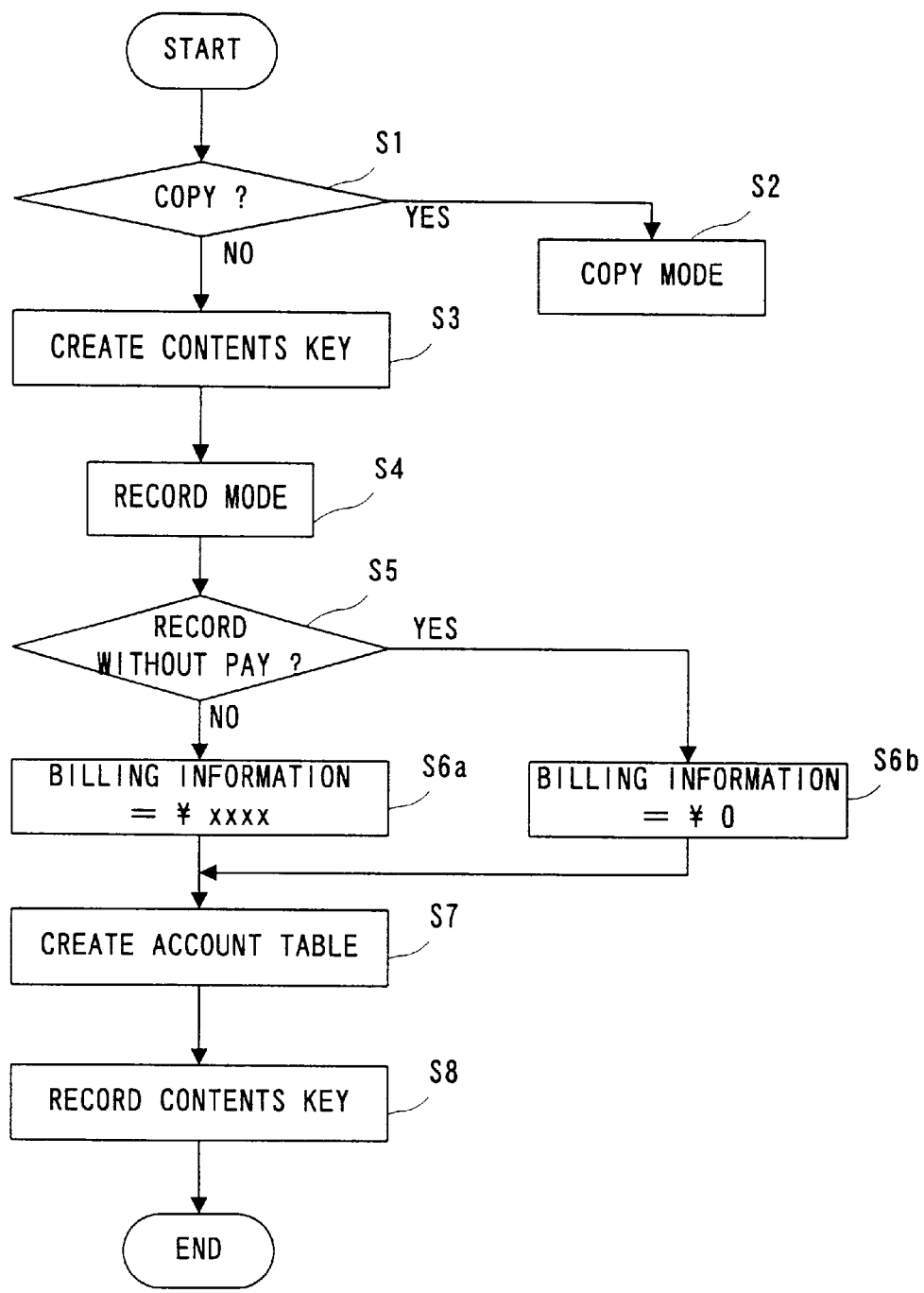
FIG. 8 is a flowchart showing the operation in a case of recording a digital television broadcast program (title) in the FIG. 1 and FIG. 4 embodiments.

Now, explanation is made on the overall operation including the STB 12 and AS-MO drive 50 with reference to FIG. 8, wherein a program (title) of a digital television broadcast is recorded into the AS-MO disc 44 according to an application system program 94 shown in FIG. 6.

It is assumed that, prior to recording, in the STB 12 a title of a digital television broadcast signal has been selected based on a program guide in accordance with menu operation on the operation panel 36 by the user. In this state, if the user desires digital record to the AS-MO disc 44, the user may operate the record key 77b on the operation panel 77 (FIG. 5). The operation signal on the record key 77b is inputted to the micro-computer 76 of the AS-MO drive 50. The micro-computer 76 sends a record key operation signal to the CPU 32 of the STB 12 through the interface 16.

Then micro-computer 76 determines in step S1 whether or not the record at that time is a copy from the disc. That is, determined whether or not the user operated copy key 77g on the operation panel 77. If the copy key 77g is operated, i.e., if a disc copy was selected, the process enters to a copy mode in step S2. This step S2 is further detailed in FIG. 12.

If there is no copy, that is, if it is a new record of a title being received though the STB 12, the CPU 32 responds to the record key operation signal inputted from the micro-computer 76, and sends a scramble key or application key 104 (FIG. 7) to remove the scramble of the title to the micro-computer 76 in the AS-MO drive 50. Meanwhile, the micro-computer 76 is inputted with an ID unique to an AS-MO disc being mounted at that time, from the ID extraction 74 of the AS-MO drive 50. The micro-computer 76, in turn, creates first a disc key 100 in step S3 according to the method explained before, and then a contents key 106 on the basis of the disc key 100 and the application key 104.

Figure 9:
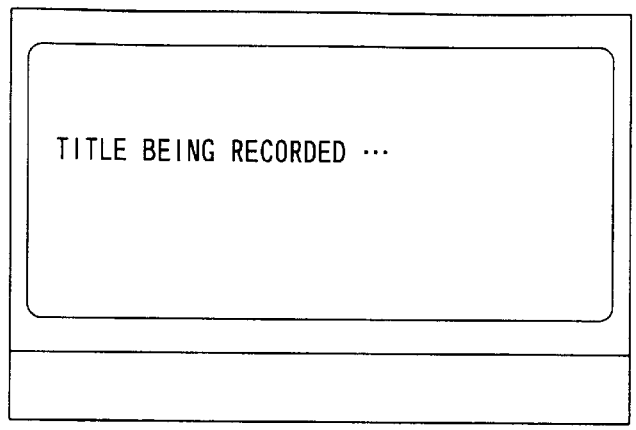
FIG. 9 is an illustrative view showing one example of an on-screen display notifying under title recording in the FIG. 8 embodiment.

The contents key 106 created in the step S3 and the scrambled data (including a header, data and control signal) sent from the stream selector 24 (FIG. 1) are sent to the MODEM 70 (43) via the ECC/EDC 68, thereby effecting a record mode in step S4. Accordingly, the title scrambled data 102 and the contents key 106 are recorded as a file system 92 (FIG. 5) on the AS-MO disc 44. Concurrently therewith, on-screen display, such as "in recording title . . . ", is effected on a television monitor (not shown) connected to the STB 12 to thereby notify the user of under recording, as shown in FIG. 9.

Figure 10:
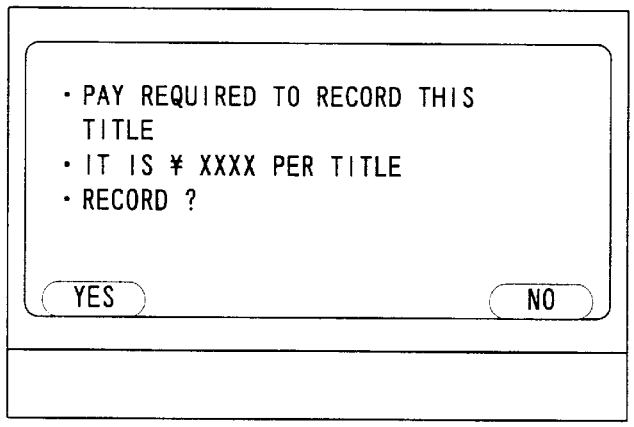
FIG. 10 is an illustrative view showing one example of displaying a billing condition, etc. on the screen in recording a title in the FIG. 8 embodiment.
Figure 10:
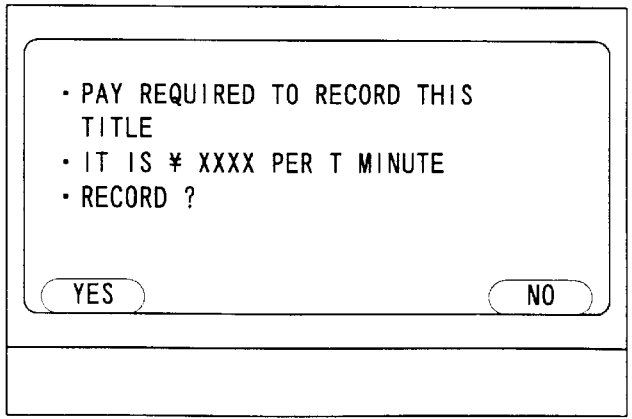

In the next step S5, the CPU 32 of the STB 12 determines whether or not the title currently under recording is free of charge to record. That is, the CPU 32 determines whether the title recording requires pay or no pay, according to the program information received form the stream selector 24. If pay is required, a billing confirmation message shown in FIG. 10(A) or FIG. 10(B) is displayed on the screen. The billing confirmation of FIG. 10(A) is to display when billing is per title, while the billing confirmation message in FIG. 10(B) is to display when billing is on a time basis. According to this billing confirmation message, the user operates the cursor key 77d of the operation panel 77 to move a cursor onto "YES" or "NO" displayed on the screen and then manipulates the determine key 77e or cancel key 77f thus approving or refusing the billing.

If the user refuses the billing, a process is performed to prohibit recording thereby displaying on the screen a message of prohibiting recording.

If recording requires pay and the user accepted the billing, the CPU 32 in step S6a calculates a fee (¥xxxx) according to the billing condition (billing for each title or on a time basis) displayed before. However, if recording of the title requires pay, the CPU 32 in step S6b sets a fee "¥0".

Figure 11:
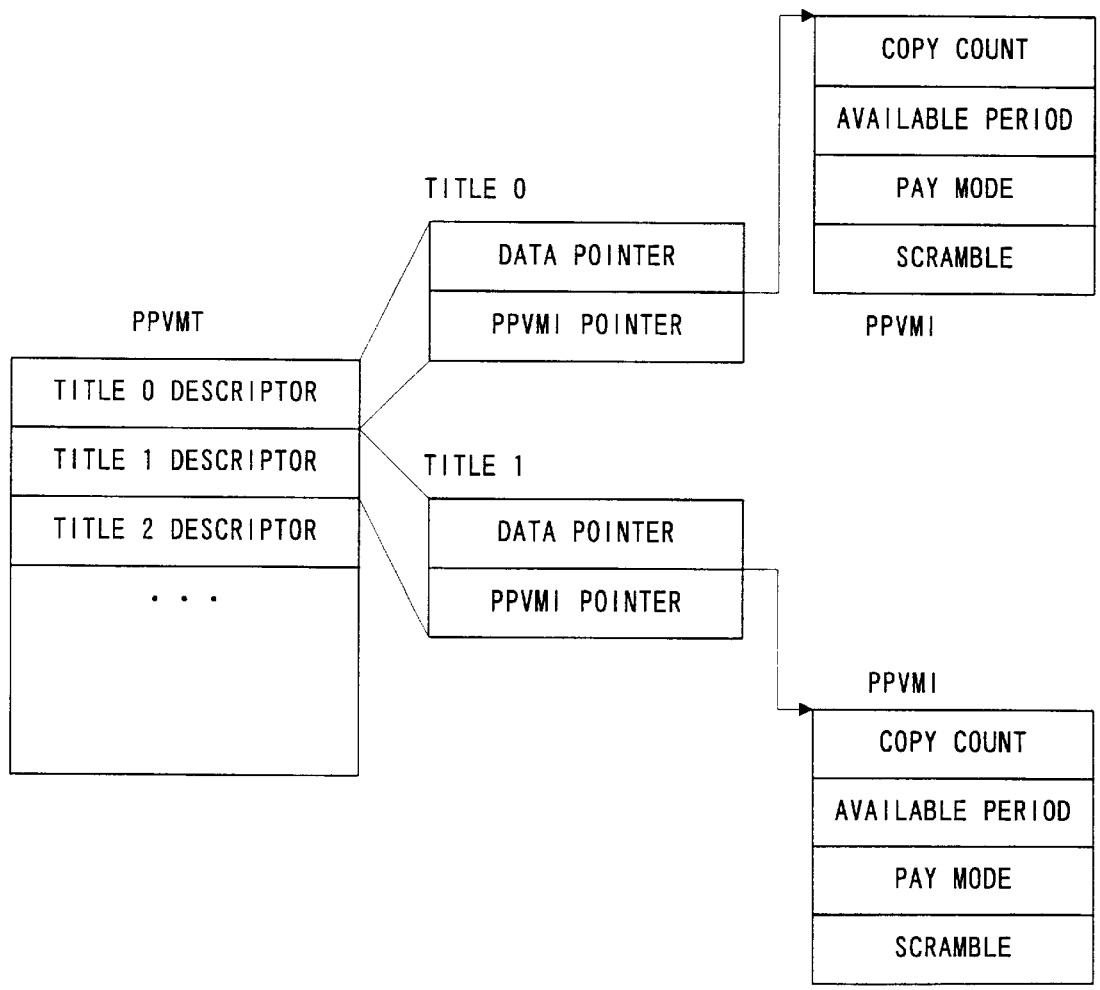
FIG. 11 is an illustrative view showing one example of an account table.

Based on the fee calculated in the step S6a or S6b, the CPU 32 in step S7 creates an account table as shown in FIG. 11. The account table includes PPVMT (Pay Per View Management Table). This PPVMT has descriptors for each title. Each descriptor includes a data pointer and PPVMI (Pay Per View Management Information). The PPVMI includes conditions of "Allowable Copy Count", "Copy Service Valuable Period", "Billing Condition (Pay Mode)" and "Scrambled or Not". This account table is recorded into the IC card 38 through the bus 36 (FIG. 1). The account table recorded within the IC card 38 is transmitted, as required, to the center (not shown) via the MODEM 40 and telephone line 42.

Finally, the CPU 32 in step S8 writes into the IC card 38 the contents key created in the step S3 and recorded to the AS-MO disc 44 in the step S4.

Figure 12:
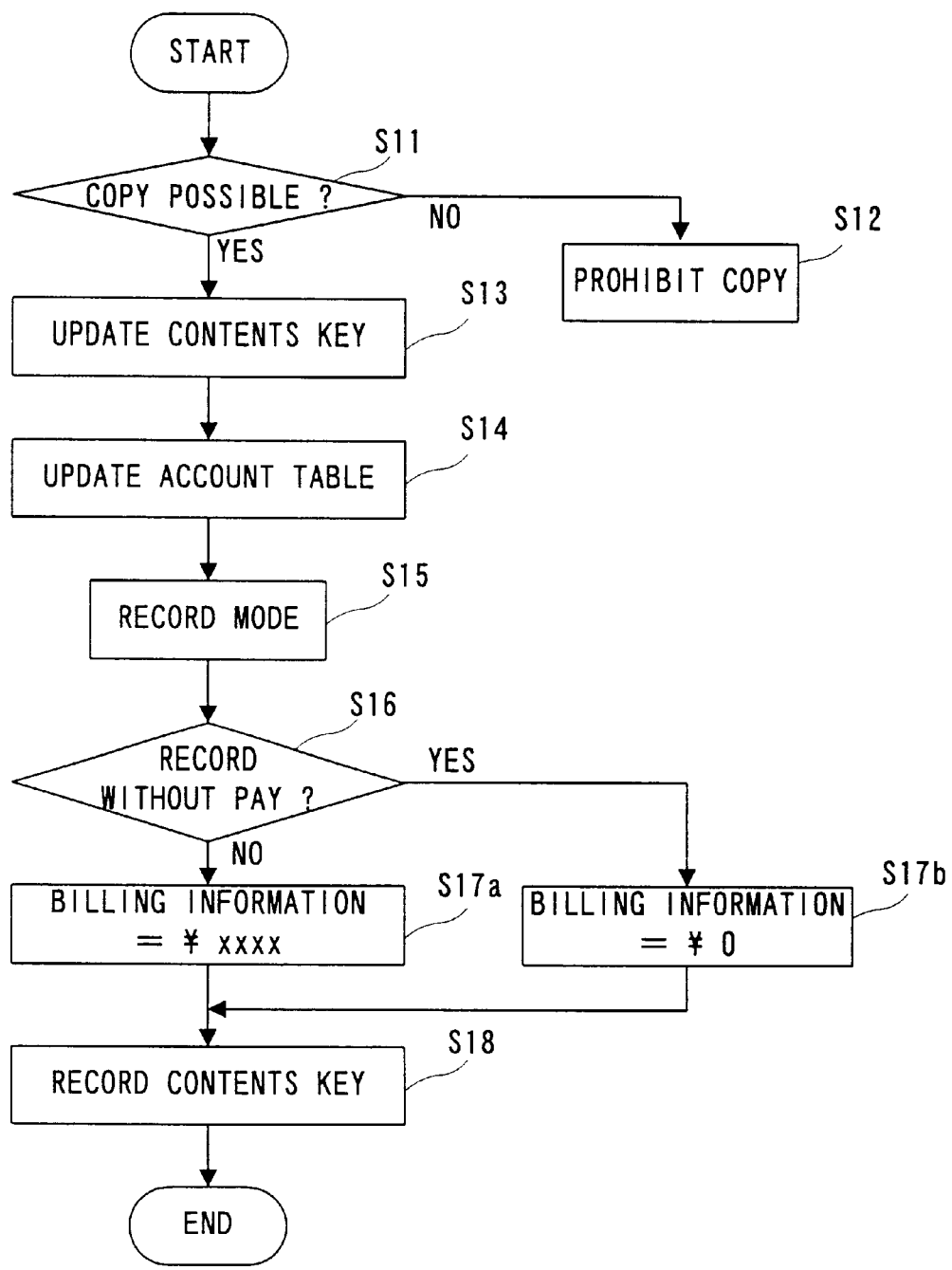
FIG. 12 is a flowchart showing the operation to copy a program (title) recorded on AS-MO in the FIG. 1 and FIG. 4 embodiments.
Figure 13:
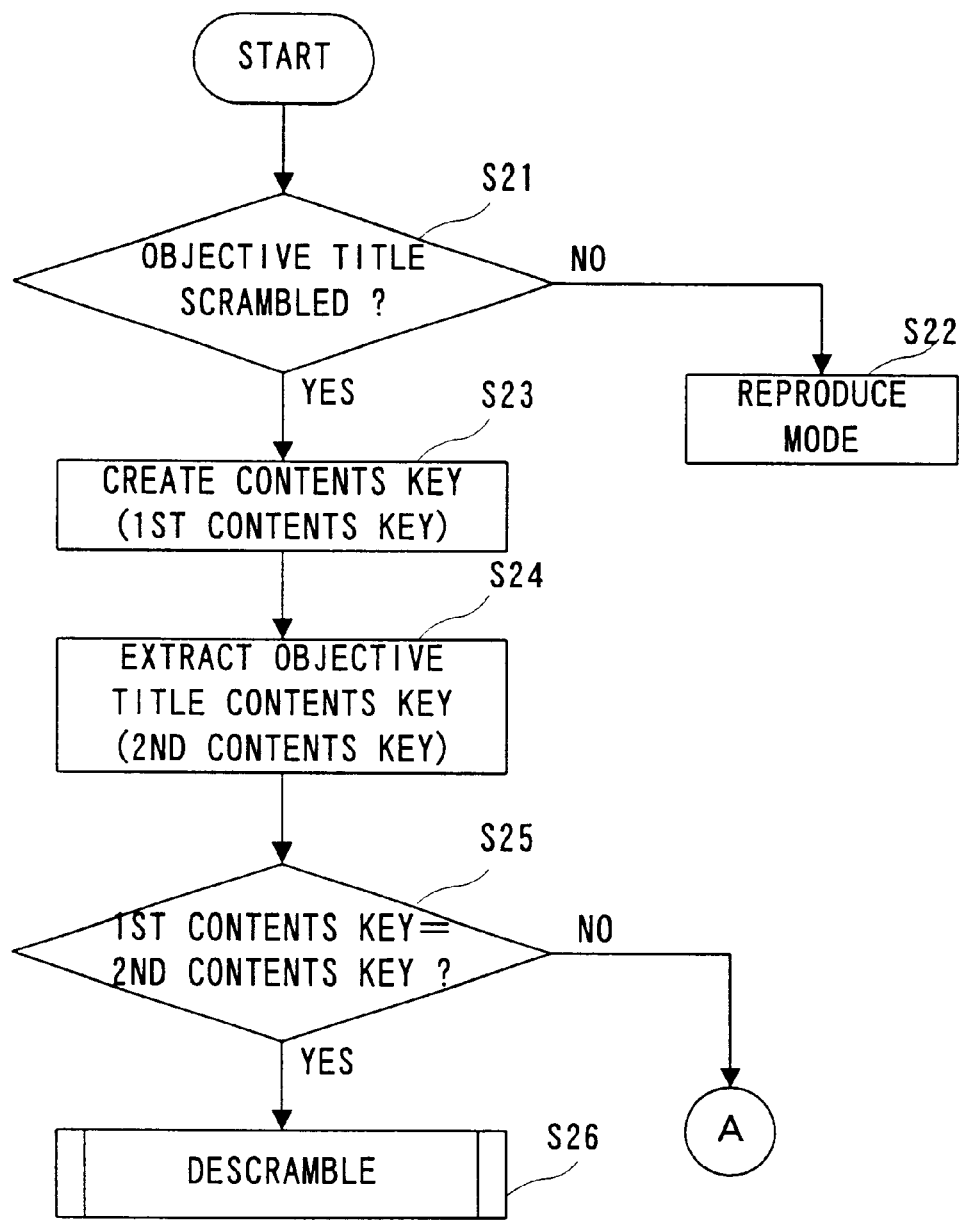
FIG. 13 is a flowchart showing the operation to produce a program (title) from a recorded AS-MO in the FIG. 1 and FIG. 3 embodiments.

Incidentally, if a disc copy is determined in step S2 of FIG. 8, that is, if the user operated the copy key 77g shown in FIG. 5, the process proceeds to a routine of FIG. 12. In this case, the AS-MO drive 50 is mounted with a recorded AS-MO as a disc to be copied. Then another STB and AS-MO drive is prepared and two STB buses 34 (FIG. 1) are connected, enabling data communication between them.

If a disc with a record or disc to be copied is put on the AS-MO drive 50, the CPU 32 reads out an account table that the CPU 32 previously recorded in the IC card 38, according to an instruction from the micro-computer 76. Because copy of a title is not allowed if the copy count in the account table is "0" or the valuable period has elapsed, the micro-computer 76 makes reference to such data and first determines in step S11 whether the disc is possible to copy or not. If copy is prohibited, in step S12 a copy prohibiting process is performed to display a message, e.g., "This title is prohibited from copying.", on the display unit.

If copy is allowed, a new AS-MO disc is put on another AS-MO drive 50. In step S13 the micro-computer 76 of the other AS-MO drive updates the contents key 106 (FIG. 7) according to an ID of the new AS-MO disc to be copied to. As was explained before, the contents key 106 is created based on a disc key 100 created form the disc ID and common key and a scramble or application key 104. Accordingly, if the AS-MO disc is replaced by a new one, the contents key 106 requires to be altered in accordance with a new disc ID). This is because the contents key 106 is to utilize for scrambled data that is recorded on the disc.

Thereafter, the CPU 32 of the STB 12 in step S14 updates the account table created in the former step S7 and recorded within the IC card 38. That is, in this step S14 "Copy Count" of the account table is updated.

A record mode is effected in step S15 by the AS-MO drive mounted with the new AS-MO disc based on the contents key 106 updated in the step S13 and the scrambled data sent from the stream selector 24 (FIG. 1).

In the next step S16, the CPU 32 of the STB 12 determines whether or not the title being currently recorded is free of charge to record. If not free of charge, the CPU 32 in step S17a calculates a fee (¥xxxx) according to the billing condition (billing for each title or on a time basis) displayed before. However, if recording the title is free of charge, the CPU 32 sets in step S17b a fee "¥0". The account table (FIG. 11) is updated with the fee thus determined. That is, the account table in the IC card 38 is updated and the updated account table is transmitted to the center (not shown) via the telephone line 42.

Finally the CPU 32 in step S18 writes the contents key updated in the former step S13 into the IC card 38.

To reproduce digital video/audio data from the AS-MO disc recorded or copied as above, the user may put the recorded disc on the AS-MO drive 50 shown in FIG. 4, and selects a program (title) to be reproduced with using the operation panel 77. Title selection data is sent from the operation panel 77 to the micro-computer 76. In step S21 the micro-computer 76 determines whether or not the title selected by the user is recorded in a scrambled condition. This determination is carried out by referring to the header information (condition) recorded on the disc, as explained before. If the objective title is not scrambled, reproduction may be made as it is (step S22).

If the objective title is scrambled, the micro-computer 76 in the next step S23 creates a first contents key in a method similar to that explained before, based on an ID unique to the AS-MO disc being placed on at that time. In the next step S24, the micro-computer 76 extracts a contents key (second contents key) for the objective title from the reproduced data.

The micro-computer 76 in step S25 determines whether or not the first and second contents keys thus obtained are in coincident with. The coincidence between the two contents keys represents that the AS-MO disc has directly recorded with a digital television signal. In this case, the process advances to a descramble routine of step S26. If not coincident, it is meant that the AS-MO disc is a copied disc. In this case, the process proceeds to a copied disc reproducing routine starting from step S30.

In step S30 the micro-computer 76 makes reference to the account table mentioned before, and determines whether or not an objective title at this time is allowed to be copied. If "NO" is determined in this step S30, a copy prohibiting process is executed by displaying a message, e.g., "objective title copy prohibited", on the screen.

If "YES" is determined in the step S30, the micro-computer 76 in the next step S31 determines whether or not the selected title is free of charge to record, based on the information given from the CPU 32 of the STB 12. If pay is required, billing information is sent to the user in order to get an acceptance for the billing. Then the micro-computer 76 calculates in step S32a a fee (¥xxxx) according to the billing condition (billing for each title or on a time basis) displayed before. However, if reproducing the title is free of charge, CPU 32 sets in step S32b a fee "¥0". With this billing condition, the account table in the IC card 32 or center (not shown) is updated.

The micro-computer 76 extracts, in the succeeding step S33, an application key 104 (FIG. 7) for the objective title contained in the reproduced data and, in step S34, updates the contents key 106 (FIG. 7) for the objective title based on the application key and the ID unique to the disc, or disc key.

In this manner, reproduction from a copied disc is made possible. The micro-computer 76 then sends this contents key via the interface 16 to the CPU 32 of the STB 12. The CPU 32 records the acquired contents key into the IC card 38 (step S35). Thereafter the process advances to a descrambe routine shown in step S36.

Figure 15:
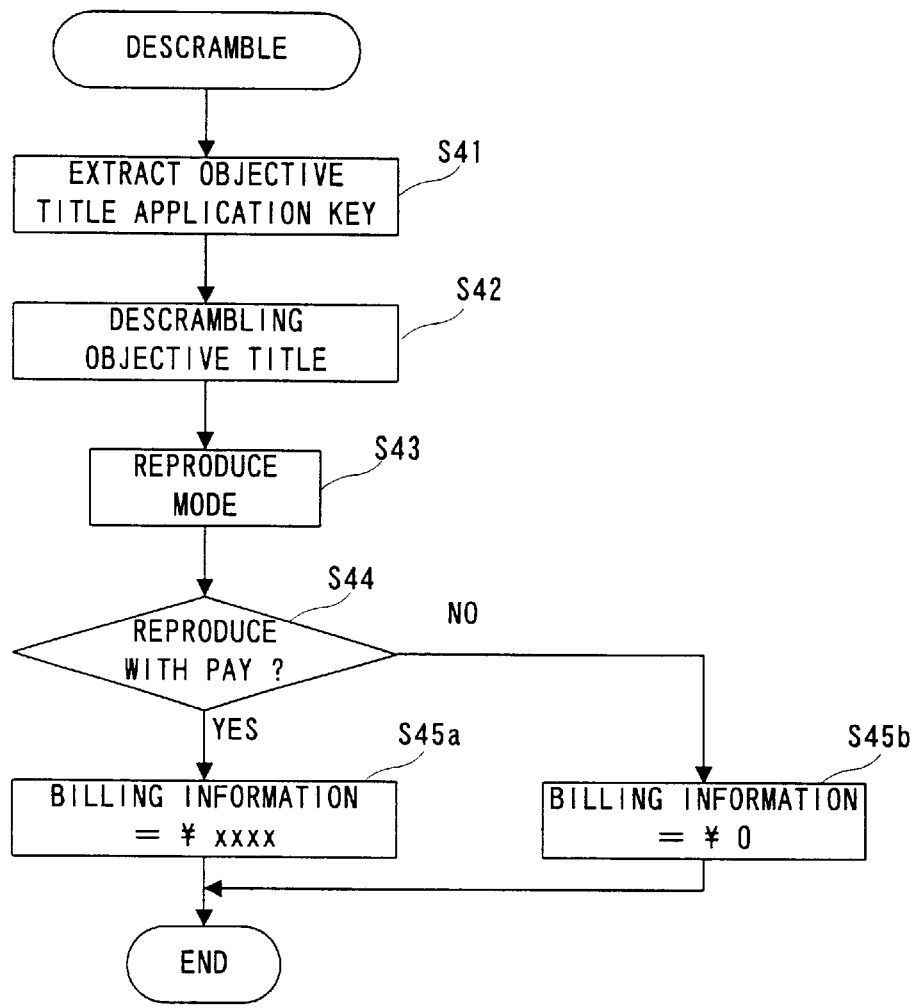
FIG. 15 is a flowchart showing a descramble subroutine in the FIG. 13 embodiment.

In the first step S41 of the descramble routine shown in FIG. 15, the micro-computer 76 extracts an application key 104 (FIG. 7) contained in the objective title data of the reproduced data. Then the micro-computer 76 sends this application key via the interface 16 to the CPU 32 of the STB 12. The CPU 32 delivers the acquired application key to the descrambler 26. Accordingly, in step S42 the objective title is subjected to descrambling by the descrambler 26, thus effecting a reproduction mode in step S43. That is, at this time point the objective title is reproduced onto the display unit (not shown) so that the user can look and listen to video image/audio sound.

In the next step S44 the CPU 32 of the STB 12 determines whether or not the title being currently reproduced requires pay. If pay is required, the CPU 32 in step S35a calculates a fee (¥xxxx) according to the billing condition (billing per title or on a time basis) displayed before. That is, the CPU 32 determines the title reproduction requires pay or not pay, according to the program information received from the stream selector 24. If pay is required, a billing confirmation message shown in FIG. 16(A) or FIG. 16(B) is displayed on the display unit (not shown) screen. The billing confirmation message of FIG. 16(A) is displayed where the billing is per title, while the billing message of FIG. 16(B) is displayed when the billing is per a given time. The user operates the cursor key 77d of the operation panel 77 in accordance with this billing confirmation message to move a cursor onto "YES" or "NO" displayed on the screen, and then operates the determine key 77e or cancel key 77f to approve or refuse the billing.

However, if the title reproduction is free of charge, the CPU 32 sets in step S35 a fee "¥0".

This billing information is recorded into the IC card 38 by the CPU 32, and sent from the MODEM 40 via the telephone line 42 to the center (not shown).

In the above embodiment, various billing methods may be contemplated as follows.

In the case that information requires pay, if pay is per title and copying is free of charge, information representative of being scrambled related to the information is given one in number for a title with adding information of free of charge to copy.

In the case that information requires pay, if pay is per title and copying requires pay, information representative of being scrambled related to the information is given one in number for a title with adding information of requiring pay.

In the case that information requires pay, if pay is per title and copy is prohibited, information representative of being scrambled related to the information is given one in number for a title with adding information of prohibiting copy.

In the case that information requires pay, if pay is per a given time/quantity and copying is free of charge, information representative of being scrambled related to the information is given one in number for a given unit with adding information of free of charge to copy.

In the case that information requires pay, if pay is per a given time/quantity and copy is prohibited, information representative of being scrambled related to the information is given one in number with adding information of prohibiting copy. The one is provided for the title with adding information of requiring pay to copy.

In the case that information requires pay, if pay is per a given time/quantity and copy is prohibited, information representative of being scrambled related to the information is given one in number with adding information of prohibiting copy.

In accordance with such various cases, an account table as shown in FIG. 11 is created and recorded into the IC card 38 (FIG. 1), the record data of which is sent as billing information to the center (not shown) whenever the data within the IC card 38 becomes full or at a constant interval. The user may pay a fee therefor.

Figure 14:
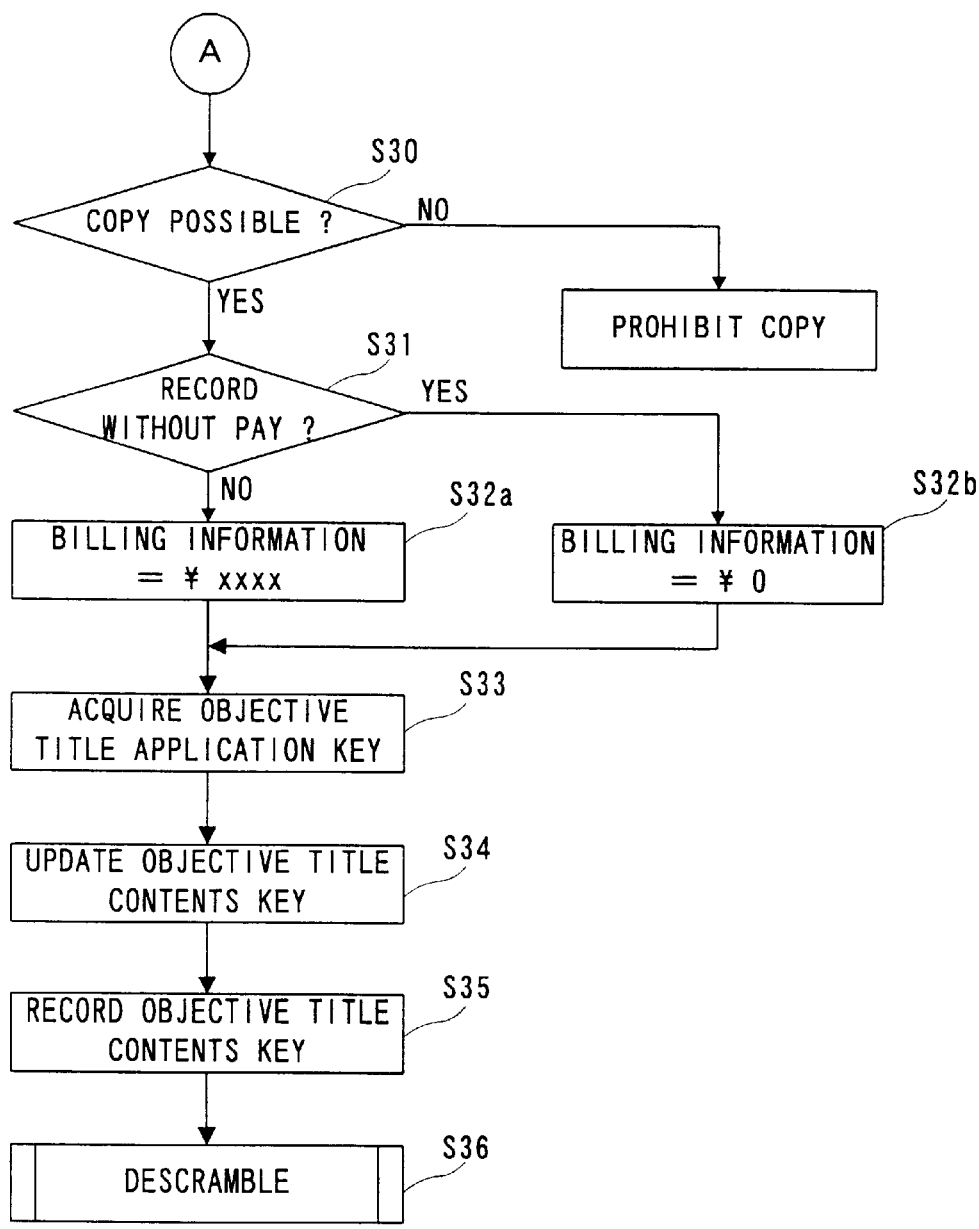
FIG. 14 is a flowchart showing a copy disc reproducing subroutine in the FIG. 13 embodiment.

However, when viewing with copied disc, it is understood that production is impossible because of the ID check. To this end, a subscription contract for copied disc is made through a menu or the like this is feasible by altering the contents key, as showing the step S34 of FIG. 14.

With such a method, media for digital copy are provided without interference with the Copyright Law. The broadcaster can provide programs not only via broadcast but also through media. A system can be offered wherein billing can be implemented and the user, if paying a due fee, is allowed to view a program even if once missed.

Furthermore, in the above embodiment the digital data output apparatus was a receiver (STB 12) used to receive digital television broadcast signals. Alternatively, it is possible to consider, as a digital data output apparatus, an arbitrary one of apparatuses, such as an AS-MO drive or DVD payer, to output scrambled digital data from a digital recording medium.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital recording system having a digital data output apparatus to output scramble digital data and a digital recording apparatus, to record the digital data to a digital recording medium, wherein said digital recording medium includes previously recorded unique identification data, said digital recording system comprising:
   a reading means for reading said unique identification data out of said data recording medium;
   a key data creating means for creating key data based on said unique identification data read by said reading means and a descramble key for descrambling said scrambled digital data; and
   a recording means for recording said the scrambled digital data and said key data to said digital recording medium.

2. A digital recording system having a digital data output apparatus to output scramble digital data and a digital recording apparatus, to record the digital data to a digital recording medium, wherein said digital recording medium includes previously recorded unique identification data, said digital recording system comprising:
   a reading means for reading said unique identification data out of said data recording medium;
   a first key creating means for creating a first key based on said unique identification data read by said reading means;
   a second key creating means for creating a second key based on said first key created by said first key data creating means and a descramble key for descrambling said scrambled digital data; and
   a recording means for recording said scrambled digital data and said second key created by said second key creating means to said digital recording medium.

3. A digital recording apparatus according to claim 1 or 2, further comprising:
   a first approval getting means for getting an approval from a user on a billing for digital recording;
   an account table creating means for creating an account table depending upon an approval of the billing by the user; and
   a register means for registering the account table.

4. A digital recording system according to claim 3, further comprising an account table transmitting means for transmitting the account table to a billing control center.

5. A digital recording system according to claim 3, wherein said first approval getting means includes a condition notifying means for notifying the user a billing condition, and an input means for inputting whether the user approves the billing according to the billing condition or not.

6. A digital recording system according to claim 3, further comprising a descramble key providing means for providing the descramble key depending upon an approval of the billing by the user.

7. A digital reproducing system for reproducing scrambled digital data out of a digital recording medium, wherein said digital recording medium includes previously recorded unique identification data and key data, said digital reproducing system comprising:
   a reading means for reading said unique identification data, said key data and said scrambled digital data out of said data recording medium;
   a first key creating means for creating a first key based on said unique identification data read by said reading means;
   a restoring means for restoring a descramble key based on said key data read by said reading means and said first key created by first key data creating means; and
   a descrambling means for descrambling said scrambled digital data by said descramble key restored by said restoring means.

8. A method for reproducing digital data from a digital recording medium wherein scrambled digital data and key data are recorded on said digital recording medium having unique identification data previously recorded, said digital data reproducing method comprising the steps of:
   (a) reading said unique identification data, key data and scrambled digital data out of said data recording medium;
   (b) creating a first key based on said unique identification data read in said step (a);
   (c) restoring a descramble key based on said key data read in said step (a) and the first key created in said step (b); and
   (d) descrambling said scrambled digital data by said descramble key restored in said step (c).

9. A method for recording digital data to a digital recording medium wherein said digital recording medium includes previously recorded unique identification data, comprising the steps of:
   (a) reading said unique identification data out of said data recording medium;
   (b) creating a first key based on said unique identification data read in said step (a) and a descramble key for descrambling said digital data; and (c) recording said scrambled digital data and said key data created in said step (b) to said digital recording medium.

10. A method for recording digital data to a digital recording medium, wherein said digital recording medium includes previously recorded unique identification data, comprising the steps of:

(a) reading said unique identification data out of said data recording medium;

(b) creating a first key based on said unique identification data read in said step (a);

(c) creating a second key based on said first key created in said step (b) and a descramble key for descrambling said scrambled digital data; and (d) recording said scrambled digital data and said second key created in step (c) to said digital recording medium.

* * * * *